United States Patent
Chachar et al.

(10) Patent No.: US 9,571,500 B1
(45) Date of Patent: Feb. 14, 2017

(54) CONTEXT SENSITIVE SECURITY HELP

(71) Applicant: International Business Machines Corporation, Armonk, NY (US)

(72) Inventors: Sumitra Chachar, Pune (IN); Rupesh M. Mukkawar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/002,567

(22) Filed: Jan. 21, 2016

(51) Int. Cl.
*G06F 7/04* (2006.01)
*H04L 29/06* (2006.01)
*G06F 3/0481* (2013.01)

(52) U.S. Cl.
CPC ............ *H04L 63/10* (2013.01); *G06F 3/0481* (2013.01)

(58) Field of Classification Search
None
See application file for complete search history.

(56) References Cited

U.S. PATENT DOCUMENTS

| | | | |
|---|---|---|---|
| 8,214,747 B1 | 7/2012 | Yankovich et al. | |
| 2013/0097662 A1* | 4/2013 | Pearcy | G06F 21/577 726/1 |
| 2013/0211559 A1* | 8/2013 | Lawson | G06Q 10/06315 700/83 |
| 2015/0205489 A1 | 7/2015 | Murphy et al. | |

OTHER PUBLICATIONS

Mell et al., "The NIST Definition of Cloud Computing", NIST Special Publication 800-145, Sep. 2011, 7 pages.

* cited by examiner

*Primary Examiner* — Brandon Hoffman
(74) *Attorney, Agent, or Firm* — Alexa L. Ashworth

(57) ABSTRACT

Embodiments of the present invention provide systems and methods for providing security in a computing environment. These systems and methods can be applied to cloud computing environments. Interfaces allow a user to request and gain user access to applications (and their equivalents) even if the applications prior to implementing the present invention do not allow the user to request or gain user access to the applications. The embodiments of this invention can operate at the granular computing level.

17 Claims, 8 Drawing Sheets

| PROJECT | DESIGNER | CREATIVE LEAD | PROJECT MANAGER | PROJECT PARTICIPANT | PROJECT REQUESTOR | PLAN ADMIN | PLAN USER |
|---|---|---|---|---|---|---|---|
| + GENERAL | | | | | | | |
| - COPY PROJECT | × | × | × | √ | × | × | × |
| - DELETE PROJECT | × | × | × | √ | × | × | × |
| - POST MESSAGE | × | × | × | √ | × | × | × |
| - ADD NEW PROJECT | × | × | × | √ | × | × | × |
| - DELETE NEW PROJECT | × | × | × | √ | × | × | × |
| - SUBSCRIBE TO ALERTS | | | | | √ | | |

FIG. 2

CONTEXT SENSITIVE SECURITY HELP

BACKGROUND OF THE INVENTION

The present invention relates generally to the field of cloud computing and enterprises on premise applications, and more specifically to the security of one or more applications in a cloud computing setting.

In this era of complex cloud applications, security is becoming increasingly crucial. Cloud application providers ensure that applications available are secure as a service via the cloud (e.g., SaaS) by specifying, designing, implementing, testing and maintaining the appropriate application security measures in the production environment. Every application has a security component which is role or permissions based. For large operations on the cloud, security considerations become more complex for users to understand. A security administrator needs to determine the exact permission to be given to the users for required operations.

Application security encompasses measures taken throughout the code's life-cycle to prevent gaps in the security policy of an application or the underlying system vulnerabilities through flaws in the design, development, deployment, upgrade, or maintenance of the application. Applications only control the kind of resources granted to them, and not which resources are granted to them. Application security determines the use of these resources by the users of the application.

SUMMARY

According to one embodiment of the present invention, a method for providing security is provided with the method comprising the steps of: examining, by one or more processors, data on a display screen comprising one or more actions which require an alteration in permission granted within a computing program; initiating, by one or more processors, an interface on the display screen to re-examine the one or more actions which require the alteration in permission granted within the computing program; selecting, by one or more processors, the one or more actions wherein an alteration in permission granted is requested; and sending, by one or more processors, a request for the alteration in permission granted for the one or more actions within the computing program to one or more administrators associated with the computing program.

Another embodiment of the present invention provides a computer program product for providing security, based on the method described above.

Another embodiment of the present invention provides a computer system for providing security, based on the method described above.

BRIEF DESCRIPTION OF THE DRAWINGS

FIG. 2 is an example of a display outputting to a user a list of roles and permissions in an enterprise product for a large application, in accordance with an embodiment of the present invention;

DETAILED DESCRIPTION

Enterprise application security (or more simply cloud security) is an evolving sub-domain of information security, which refers to a broad set of policies, technologies, and controls deployed to protect data, applications, and the associated infrastructure of cloud computing. Cloud computing has various capabilities to store and process their data in third-party data centers. Cloud computing is consumed through a variety of different service models (e.g., SaaS, PaaS, and IaaS) and deployment models (e.g., Private, Public, Hybrid, and Community). There are a number of security issues/concerns associated with cloud computing, but these issues may fall into two broad categories: security issues faced by cloud providers (i.e., organizations providing software-, platform-, or infrastructure-as-a-service via the cloud) and security issues faced by cloud users (companies or organizations who host applications or store data on the cloud). When an organization elects to store data or host applications on the cloud, it loses its ability to have physical access to the servers hosting its information. As a result, potential business sensitive and confidential data is at risk from insider attacks. Embodiments of the present invention disclose methods and systems to provide more granular application security via a display screen, with the names of permissible users mentioned for accessing various parts of the display screen (e.g., sections, button, or links).

Figure 1:
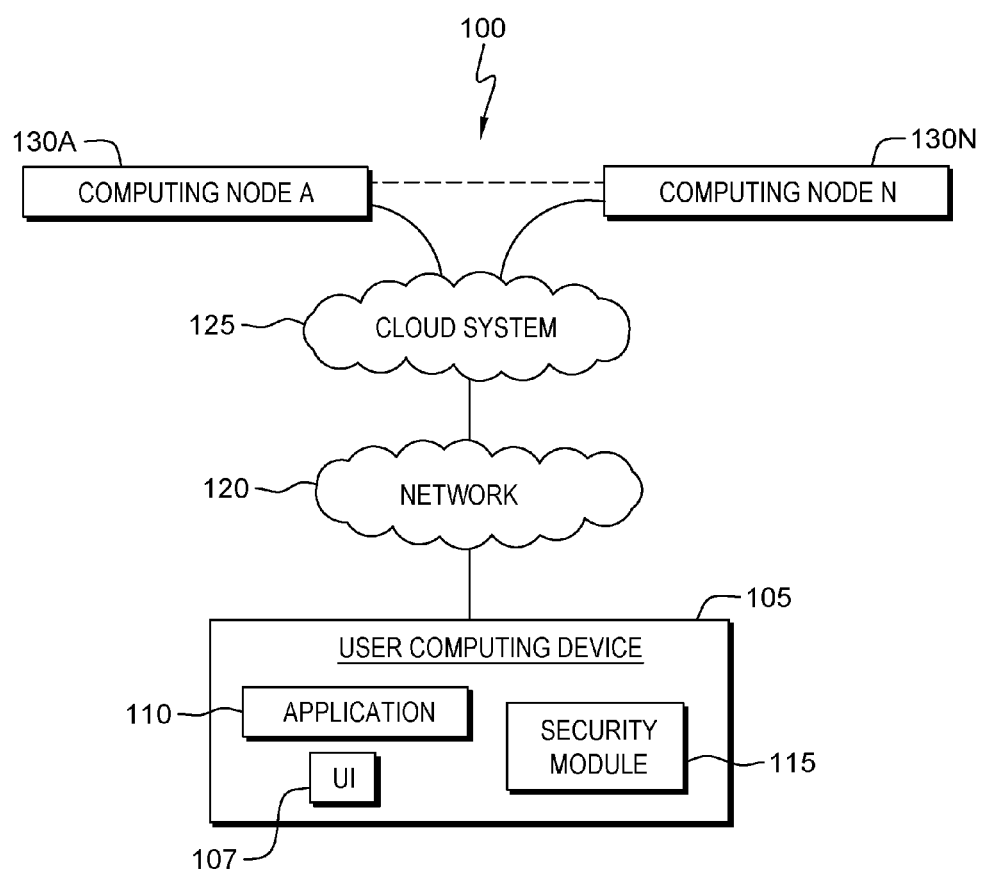
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes computing nodes 130A-N and user computing device 105 connected by network 120 and cloud system 125.

Computing nodes 130A-N are devices or data points on a larger network. Devices may be, but are not limited to, a personal computer, cell phone, or printer. When defining nodes on the Internet, a node is anything that has an IP address. Nodes are individual parts of a larger data structure (e.g., linked lists and tree data structures); contain data; and may be linked to other nodes. Links between nodes are often implemented by pointers. Within a vast computer network, end nodes are nodes on the periphery of the network, nodes which do not connect other networks, and nodes which often connect transiently to one or more clouds. Typically, within the cloud computing construct, the individual user/customer computer that connects into one well-managed cloud is called an end node.

Cloud system 125 is a type of computing system that relies on sharing computing resources rather than having local servers or personal devices to handle computing applications. Cloud systems utilize unused processing cycles of all computers in a network to solve problems which are too intensive for any stand-alone machine. Different services (e.g., servers, storage, and applications) are delivered to an organization's computers and devices through network 120 (e.g., the Internet). Cloud system 125 is able to provide a platform for information granularity in order to process complex informational entities. The processing of complex information entities, called information granules, arises during data abstraction and derivation of knowledge from information or data. Generally speaking, information granules are collections of entities that originate at the numeric level and are arranged together due to their similarity, functional or physical adjacency, indistinguishability, coherency, or the like.

Network 120 can be, for example, a local area network (LAN), a wide area network (WAN) such as the Internet, or a combination of the two, and can include wired, wireless, or fiber optic connections. In general, network 120 can be any combination of connections and protocols that will support communication between user computing device 105 and cloud system 125 and user computing device 105 and computing nodes 130A-N.

User interface 107 may be for example, a graphical user interface (GUI) or a web user interface (WUI) and can display text, documents, web browser windows, user options, application interfaces, and instructions for operation, and includes the information (such as graphics, text, and sound) a program presents to a user and the control sequences the user employs to control the program. User interface 107 is capable of receiving data, user commands, and data input modifications from a user and is capable of communicating with application 110 and security module 115.

Application 110 has a security utility which is role/permissions based. For bigger applications, the security becomes more complex for a user to understand. Many times it is difficult for a security administrator also to determine the exact permission to be given to the user for a required operation. Application security encompasses measures taken throughout the code's life-cycle to prevent gaps in the security policy of an application or the underlying system (vulnerabilities) through flaws in the design, development, deployment, upgrade, or maintenance of application 110. Applications only control the kind of resources granted to them, and not which resources are granted to them. In turn, application 110 determines the use of these resources by users of application 110 through the security utility.

Security module 115 works in conjunction with application 110 and user interface 107. A display screen which resembles a currently in-use application display screen is presented to a user. Security module 115 supports "context sensitive security help" for application 110 where "context sensitive security help" depicts user interface 107 which appears upon receiving a key press/combination. The display screen lists the permission names mentioned for accessing various parts of the display screen (e.g., sections, button, and links) which permits the user to understand the permissions and contact the administrator for granting the required permission(s). A request is sent to an administrator by clicking on the hyperlink associated with the permission names. Security module 115 enhances the security utility of application 110 and through user interface 107, performs the following functionalities: (i) permitting a user to log into application 110; (ii) permitting a user to access a display screen via user interface 107; (iii) permitting a user to input a combination of commands to access a desired section; (iv) creating a new user interface 107 which presents sections with different permission names; and (v) notifying a security administrator for permission to be granted access upon clicking on a hyperlink, button, or section. On the display screen, security module 115 can detect and determine a set of input command keys which correspond to the request for security help. Upon altering user interface 107, permission names on different parts of the display screen (different sections with different permissions can be color coded) and hyperlinks for requesting security access from an administrator are presented to the user.

User computing device 105 includes application 110, security module 115, and user interface 107. User computing device 105 may be a laptop computer, a tablet computer, a netbook computer, a personal computer (PC), a desktop computer, a personal digital assistant (PDA), a smart phone, a thin client, or any programmable electronic device capable of communicating with application 110 and security module 115. User computing device 105 may include internal and external hardware components, as depicted and described in further detail with respect to FIG. 6.

FIG. 2 is an example of a display screen outputting to a user a list of roles and permissions in an enterprise product for a large application, in accordance with an embodiment of the present invention.

Display screen 200 has a list of projects (i.e., tasks) and the persons who may potentially be associated with a project. In this embodiment, the persons are: "designer"; "creative lead"; "project manager"; "project participant"; "project requester"; "plan admin"; and "plan user." In this embodiment, the projects are of a "general" nature where the projects are: "copy project"; "delete project"; "post message"; "add new project"; "delete new project"; and "subscribe to alerts." An "x" mark indicates a person does not have permission to do a particular project. An "√" mark indicates a person does have permission to do a particular project. For example, the "designer" does not have permission to do any of the projects as indicated by the associated "x" marks; the "project participant" does have permission to do any project as indicated by the associated "√" marks; and the "project requester" has permission to "subscribe to alerts" as indicated by the associated "√" mark but not the other projects as indicated by associated "x" marks. As the number of projects and persons associated with the application increases, then managing (i.e., viewing, altering, reconfiguring, etc.) permissions across projects and persons can get very complicated and cumbersome. In other embodiments, the display screen outputting the list of roles and permissions for the enterprise product for a large application may vary.

Figure 3:
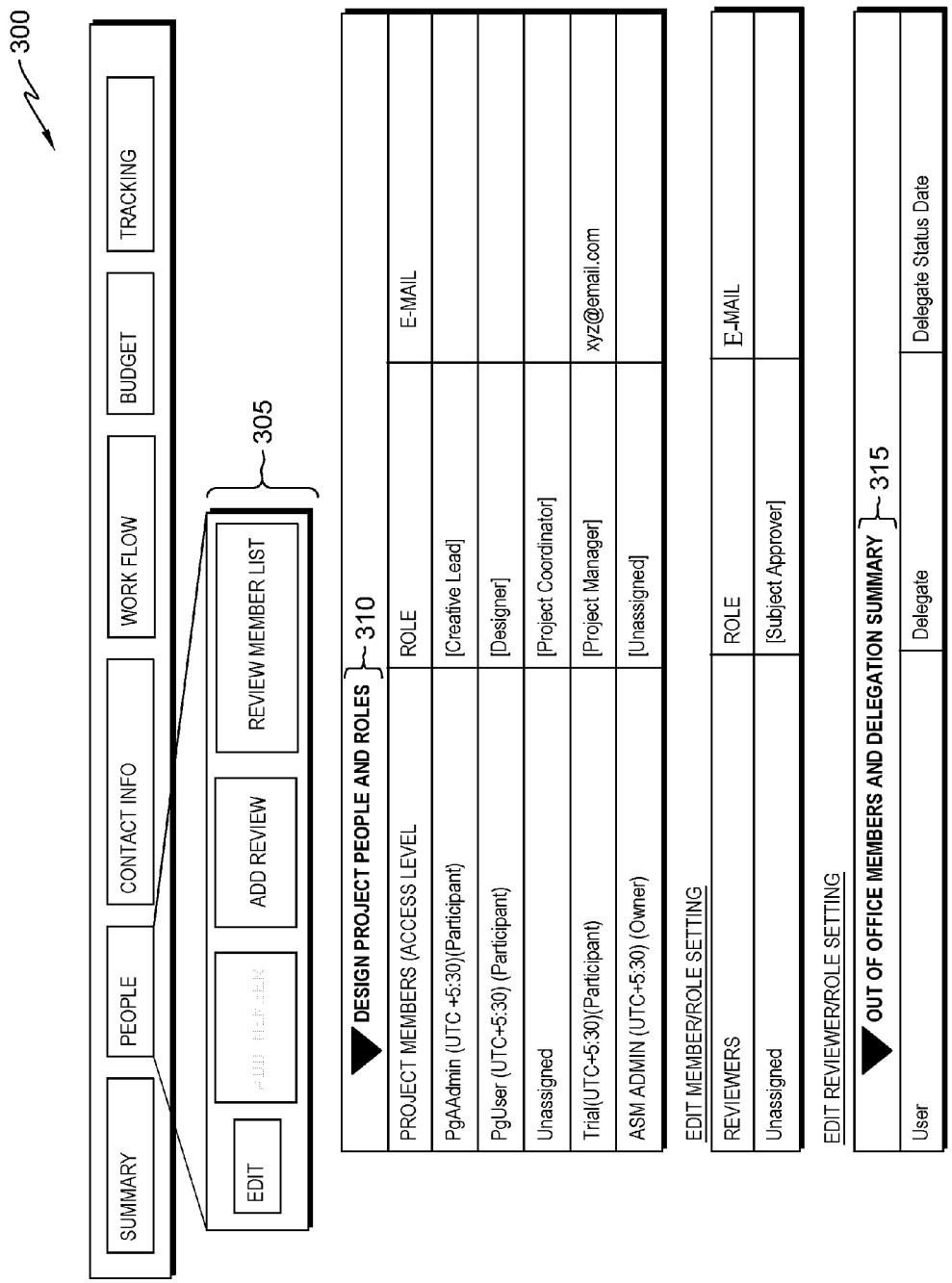
FIG. 3 is an example of a summary page for an enterprise product prior to applying security module 115, in accordance with an embodiment of the present invention.

FIG. 3 is an example of a summary page for an enterprise product prior to applying security module 115, in accordance with an embodiment of the present invention.

Display screen 300 is a display screen of an application via user interface 107 with multiple sections, buttons, and links. These are rendered available or not available depending upon some specific roles and permission. As indicated by the lighter shading of the "Add Member" button within link 305 (as opposed to the other button within link 305), the "Add Member" button is not available for use. The other buttons within link 305 do not contain lighter shading, and thus are available for use. The links 305 and 310 are not accessible to the user. In this display screen, security module 115 is not being utilized. Thus, the user is unable to access a user interface which grants permission related to a specific section or for requesting access/permission from an administrator.

Figure 4:
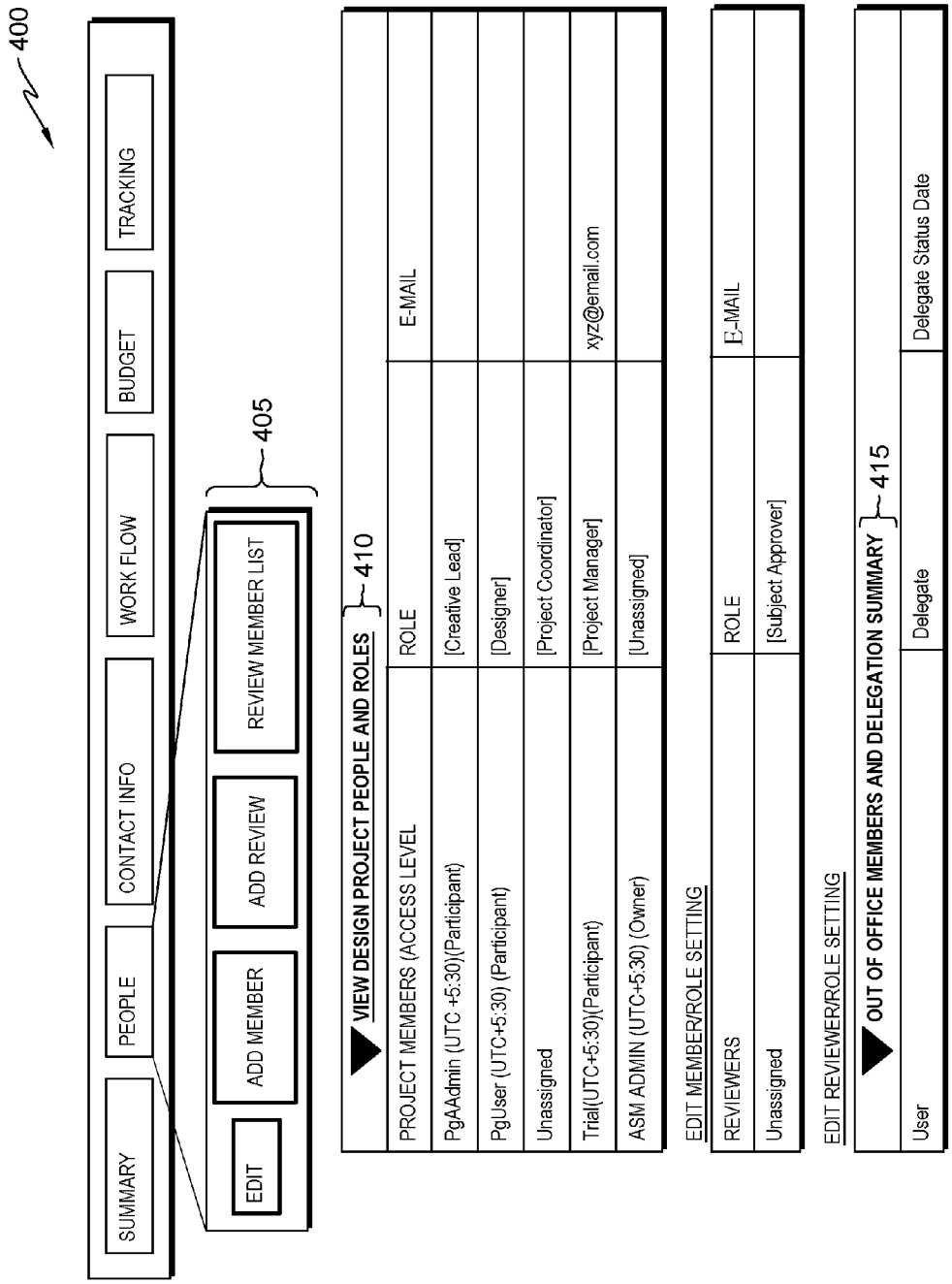
FIG. 4 is an example of a summary page for an enterprise product after applying security module 115, in accordance with an embodiment of the present invention.

FIG. 4 is an example of a summary page for an enterprise product after applying security module 115, in accordance with an embodiment of the present invention.

Display screen 400 is a display screen of an application with multiple sections, buttons, and links. By pressing specific key combinations (i.e., pressing F9), a security help page appears resembling the display screen in FIG. 4. By clicking on a link, a multiple section, or a button user, security module 115 allows a user to request access for permission from an administrator. A "context sensitive security help" for an application appears where the "context sensitive security help" depicts new user interface 107 which appears upon a key press combination. Depending upon the key press combination, security module 115 understands the request of that user and dictates the security help which is being asked of security module 115. User interface 107 changes and appears to display permission names on different parts of display screen 400 and different sections with different permissions which can be color coded. User interface 107 also has hyperlinks for requesting security access from an administrator. In display screen 400, the following buttons can now be accessed as indicated by the bold box surrounding them: "edit"; "add member"; "add review"; and "review member list." These buttons in bar 405 do not contain any lighter shading (e.g., "gray" buttons), which is indicative of not being available for use, as opposed to the "add member" button in link 305 in FIG. 3. Link 410 is now accessible as the text "view design project people and roles" is now underlined as opposed to link 310 in FIG. 3 where the text is not underlined. Link 415 is still not accessible as the text is not underlined (i.e., the text for link 415 appears the same to the user as it did in link 315).

Figure 5:
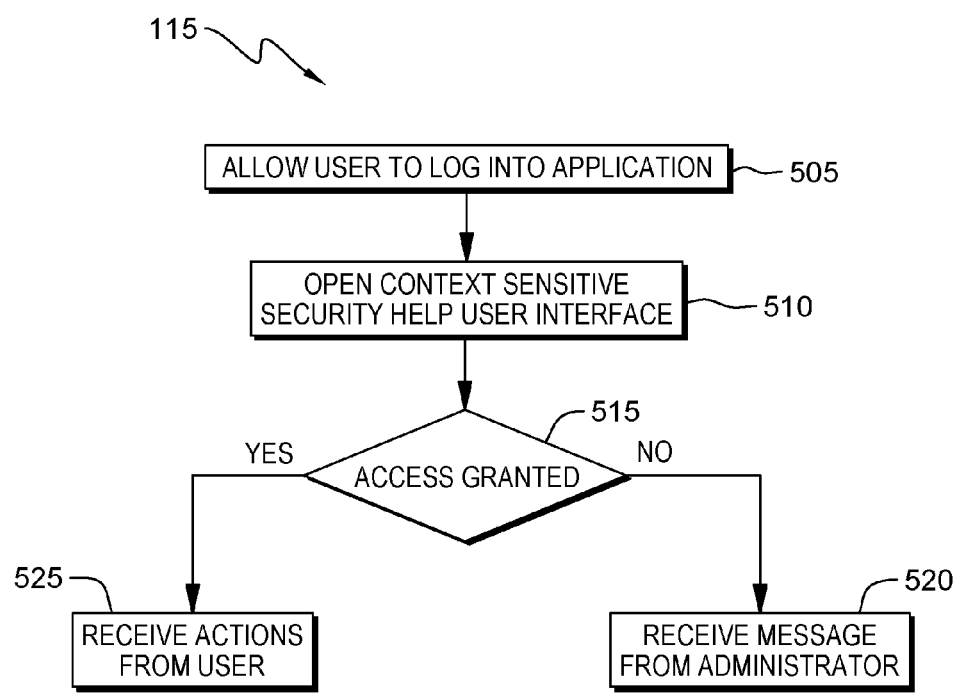
FIG. 5 is a flowchart depicting the operational steps performed by security module 115 in order to provide all permissions mentioned in the form of a new user interface in conjunction with an enterprise product, in accordance with an embodiment of the present invention.

FIG. 5 is a flowchart depicting the operational steps performed by security module 115 in order to provide all permissions mentioned in the form of a new user interface in conjunction with an enterprise product, in accordance with an embodiment of the present invention.

In step 505, security module 115 allows a user to log into application 110. More specifically, the security utility of application 110 works in conjunction with security module 115. Security module 115 allows the user to navigate to an intended display screen in order to perform a desired specific activity (e.g., altering user permissions for a task/action) within application 110. In an exemplary embodiment, the user realizes that he/she does not have access (i.e., not enabled) to perform the action/task that he/she needs to have access to (in order to perform the desired specific activity).

In step 510, security module 115 opens context sensitive security help user interface 107. The user may input a set of commands to initiate the opening of context sensitive security help through a new user interface within user interface 107. The new user interface 107 resembles the user interface 107 that the user previously accessed in step 505. (Note: User interface 107 in step 505 is reminiscent of the display screen depicted in FIG. 3, while user interface 107 in step 510 is reminiscent of the display screen depicted in FIG. 4.) The user is now able to request permission for the desired action by clicking on a hyperlink associated with a specific permission (i.e., security module 115 receives a request for granting permission). Security module 115 displays a popup window to the user which asks for business justification information. Then, security module 115 sends a request to the administrator for the specific permission. The security permissions in application 110 may be very complex and are very granular i.e., the information is in the form of collected entities which are arranged together by type of commonality. Many times, while using application 110, the user may find some actions are disabled which the user needs to be enabled, or some intended information is missing on the display screen. Context sensitive security help user interface 107 allows the user to easily identify the security permissions and helps the user to request the appropriate permissions very efficiently. Thus, the user is able to scan the display screen to determine which permissions need to be requested, and sends a message/mail to the administrator for granting access to the action typically requiring the business justification.

In step 515, security module 115 determines if access is granted. The request for the specific permission has been sent to the administrator by security module 115. Depending on the user role and the business justification, the administrator is able to make a determination as to whether or not to grant or deny access to the specific permission. The context sensitive security help user interface 107 is also provided to the administrator where the administrator can examine all the requests and take the appropriate action (i.e., grant or deny access) based on the business justification.

In step 520, if security module 115 determines access has not been granted (i.e., the "No" branch), then security module 115 receives a message from the administrator. The message received, with comments from the administrator, is then sent to the user. Depending on pre-configured conditions, the message conveys varying types of information to the user.

In step 525, if security module 115 determines access has been granted (i.e., the "Yes" branch), then security module 115 receives actions from the user. The user is now able to perform the desired action(s) and thus is able to select the desired action(s). Security module 115 receives the actions from the user and transfers the actions to application 110, in order to finish the execution of the actions.

Figure 6:
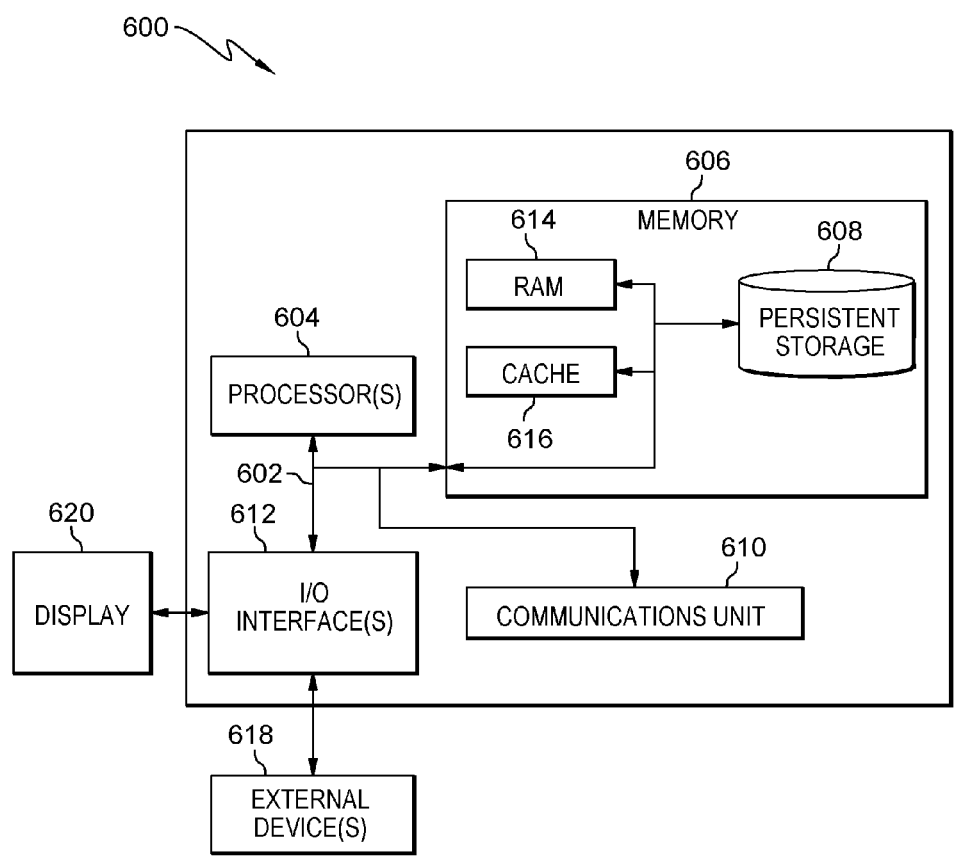
FIG. 6 depicts a block diagram of internal and external components of a computing device, in accordance with an embodiment of the present invention.

FIG. 6 depicts a block diagram of components of a computing device, generally designated 600, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Program instructions and data used to practice embodiments of the present invention may be stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to computing device 600. For example, I/O interface 612 may provide a connection to external devices 618 such as a keyboard, keypad, a touch display screen, and/or some other suitable input device. External devices 618 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

Figure 7:
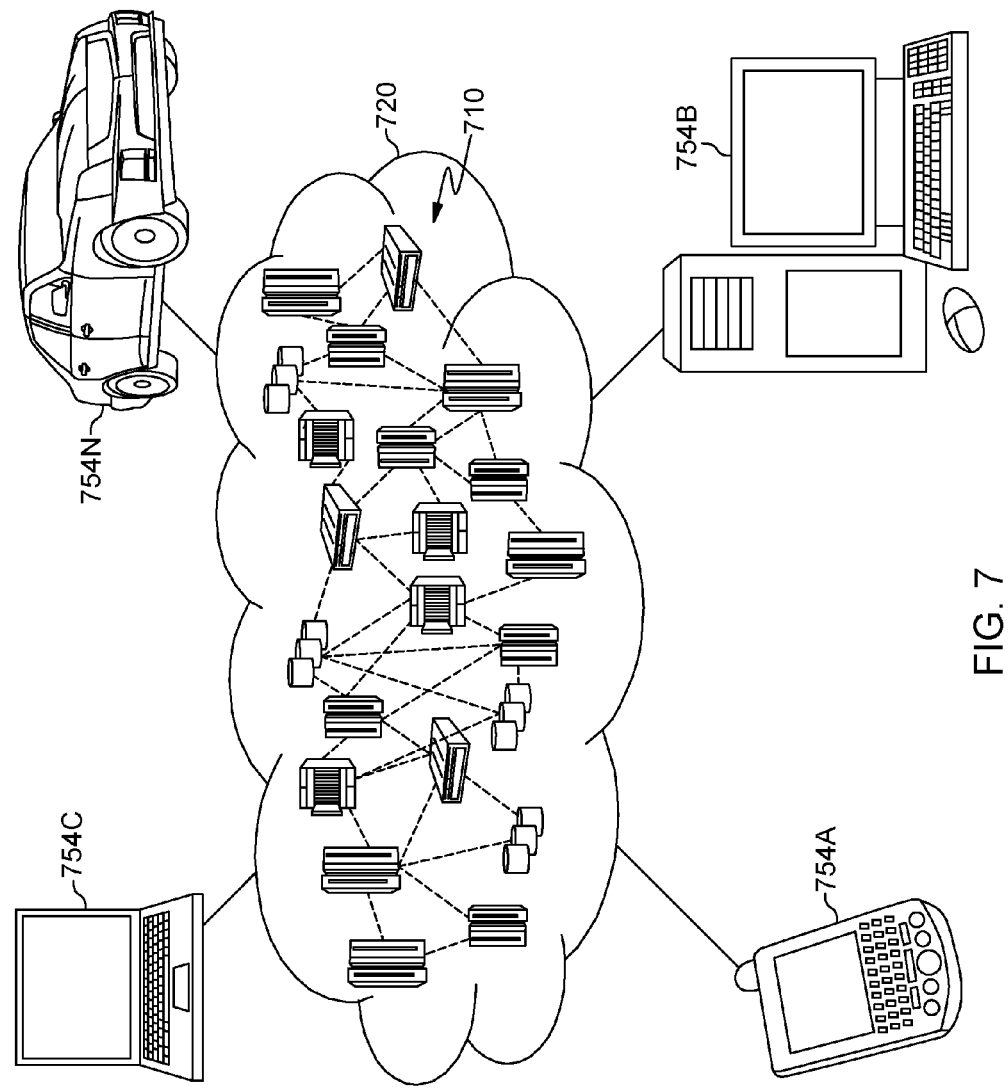
FIG. 7 depicts a cloud computing environment, in accordance with an embodiment of the present invention.

Referring now to FIG. 7, illustrative cloud computing environment is depicted. As shown, cloud computing environment 700 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 700 can communicate with any type of computerized device over any type of network and/or network addressable connection (e.g., using a web browser).

Figure 8:
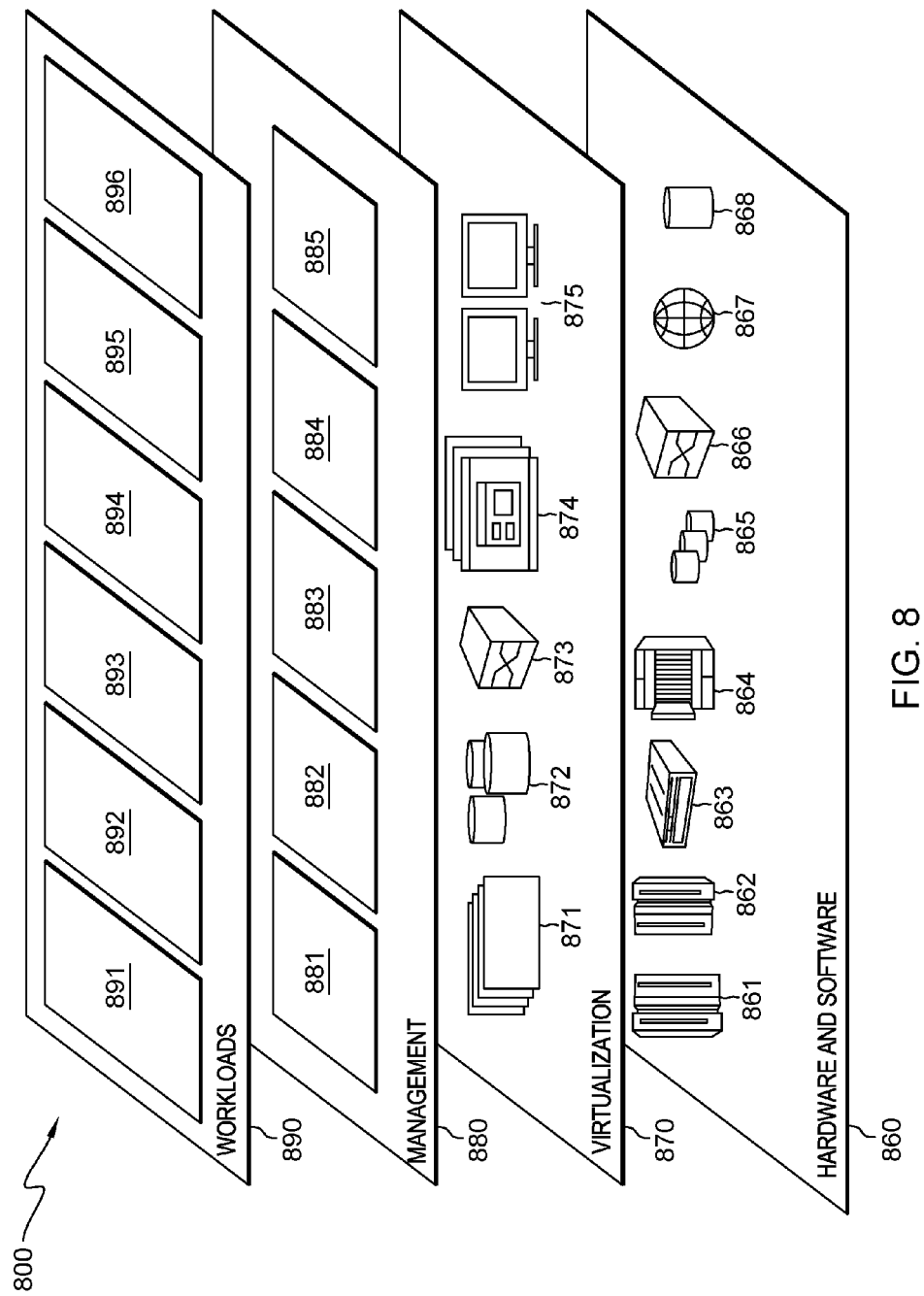
FIG. 8 depicts a set of functional abstraction layers provided by cloud computing environment, in accordance with an embodiment of the present invention.

Referring now to FIG. 8, a set of functional abstraction layers provided by cloud computing environment 800 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 63; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and application module 896.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: on-demand self-service: a cloud consumer can unilaterally provision computing capabilities, such as server time and network storage, as needed automatically without requiring human interaction with the service's provider; broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure that includes a network of interconnected nodes.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for providing security, the method comprising the steps of:
   responsive to receiving a request from a user to alter permissions granted to access one or more actions within a computing program, on a display screen comprising visual features which represent one or more actions within the computing program, initiating, by one or more processors, an integrated interface on the display screen to examine the one or more actions in which the user requests the alteration in permission be granted within the computing program, wherein the integrated interface is embedded within the computing program;
   displaying, by one or more processors, the request to alter the permissions granted through the integrated interface; and
   sending, by one or more processors, the request to alter the permissions granted for the one or more actions within the computing program to one or more administrators associated with the computing program, wherein the request is viewable to the one or more administrators within the integrated interface.

2. The method of claim 1, wherein initiating the integrated interface on the display screen, comprises:
   outputting, by one or more processors, a plurality of permission names, wherein each of the plurality of permission names is associated with a section of the display screen;
   accessing, by one or more processors, the integrated interface on the display screen by receiving a set of commands to trigger an appearance of a new interface on the display screen, wherein the new interface maintains visual features of an initial view of the display; and
   modifying, by one or more processors, the visual features of the initial view of the display, wherein the modified visual features are indicative of an action which is characterized as one of: disabled, enabled, hidden, and without content.

3. The method of claim 2, wherein receiving the set of commands to trigger the appearance of the new interface on the display screen, further comprises:
   sending, by one or more processors, contents of the new interface on the display screen, to the user;
   sending, by one or more processors, business credential information to the one or more administrators associated with the computing program; and
   determining, by one or more processors, whether to grant permission to the one or more actions within the computing program, based in part on a project requirement.

4. The method of claim 1, further comprises:
   responsive to granting permission to the one or more actions within the computing program, allowing, by one or more processors, the one or more actions within the computing program to be executed by the user, wherein the visual features of the display associated with the one or more actions are enabled; and responsive to not granting permission to the one or more actions within the computing program, sending, by one or more processors, a message from the one or more administrators, to the user, wherein the visual features of the display associated with the one or more actions are disabled.

5. The method of claim 1, wherein the integrated interface on the display screen is of at least a granular level.

6. The method of claim 1, wherein the integrated interface is configured in a cloud computing system.

7. A computer program product for providing security, the computer program product comprising:
   a computer readable storage medium and program instructions stored on the computer readable storage medium, the program instructions comprising:
   responsive to receiving a request from a user to alter permissions granted to access one or more actions within a computing program, on a display screen comprising visual features which represent one or more actions within the computing program, program instructions to initiate an integrated interface on the display screen to examine the one or more actions in which a user requests the alteration in permission be granted within the computing program, wherein the integrated interface is embedded within the computing program;
   program instructions to display the request to alter the permissions granted through the integrated interface; and
   program instructions to send the request to alter the permissions granted for the one or more actions within the computing program to one or more administrators associated with the computing program, wherein the request is viewable to the one or more administrators within the integrated interface.

8. The computer program product of claim 7, wherein program instructions to initiate the integrated interface on the display screen, comprise:
   program instructions to output a plurality of permission names, wherein each of the plurality of permission names is associated with a section of the display screen;
   program instructions to access the integrated interface on the display screen by receiving a set of commands to trigger an appearance of a new interface on the display screen, wherein the new interface maintains visual features of an initial view of the display; and
   program instructions to modify the visual features of the initial view of the display, wherein the modified visual features are indicative of an action which is associated with an option of being: disabled, enabled, hidden, or without content.

9. The computer program product of claim 8, wherein program instructions to receive the set of commands to trigger the appearance of the new interface on the display screen, further comprise:
   program instructions to send the new interface on the display screen, to the user;
   program instructions to send business credential information to the one or more administrators associated with the computing program; and
   program instructions to determine whether to grant permission to the one or more actions within the computing program, based in part on a project requirement.

10. The computer program product of claim 7, further comprises:
    responsive to granting permission to the one or more actions within the computing program, program instructions to allow the one or more actions within the computing program to be executed by the user, wherein the visual features of the display associated with the one or more actions are enabled; and
    responsive to not granting permission to the one or more actions within the computing program, program instructions to send a message from the one or more administrators, to the user, wherein the visual features of the display associated with the one or more actions are disabled.

11. The computer program product of claim 7, wherein the integrated interface on the display screen is of at least a granular level.

12. The computer program product of claim 7, wherein the integrated interface is configured in a cloud computing system.

13. A computer system, the computer system comprising:
    one or more computer processors;
    a computer readable storage device; and
    program instructions stored on the computer readable storage device for execution by at least one of the one or more processors, the program instructions comprising:
    responsive to receiving a request from a user to alter permissions granted to access one or more actions within a computing program, on a display screen comprising visual features which represent one or more actions within the computing program, program instructions to initiate an integrated interface on the display screen to examine the one or more actions in which a user requests the alteration in permission be granted within the computing program, wherein the interface is integrated within the computing program;
    program instructions to display the request to alter the permissions granted through the integrated interface; and
    program instructions to send the request to alter the permissions granted for the one or more actions within the computing program to one or more administrators associated with the computing program, wherein the request is viewable to the one or more administrators within the integrated interface.

14. The computer system of claim 13, wherein program instructions to initiate the integrated interface on the display screen, comprise:
    program instructions to output a plurality of permission names, wherein each of the plurality of permission names is associated with a section of the display screen;
    program instructions to access the integrated interface on the display screen by receiving a set of commands to trigger an appearance of a new interface on the display screen, wherein the new interface maintains visual features of an initial view of the display; and
    program instructions to modify the visual features of the initial view of the display, wherein the modified visual features are indicative of an action which is associated with an option of being: disabled, enabled, hidden, or without content.

15. The computer system of claim 14, wherein program instructions to receive the set of commands to trigger the appearance of the new interface on the display screen, further comprise:
    program instructions to send the new interface on the display screen, to the user;
    program instructions to send business credential information to the one or more administrators associated with the computing program; and program instructions to determine whether to grant permission to the one or more actions within the computing program, based in part on a project requirement.

16. The computer system of claim 13, further comprises:

responsive to granting permission to the one or more actions within the computing program, program instructions to allow the one or more actions within the computing program to be executed by the user, wherein the visual features of the display associated with the one or more actions are enabled; and responsive to not granting permission to the one or more actions within the computing program, program instructions to send a message from the one or more administrators, to the user, wherein the visual features of the display associated with the one or more actions are disabled.

17. The computer system of claim 13, wherein the integrated interface on the display screen is of at least a granular level.

* * * * *